United States Patent
Zhou

(10) Patent No.: US 10,748,345 B2
(45) Date of Patent: Aug. 18, 2020

(54) 3D OBJECT COMPOSITION AS PART OF A 2D DIGITAL IMAGE THROUGH USE OF A VISUAL GUIDE

(71) Applicant: Adobe Inc., San Jose, CA (US)

(72) Inventor: Qingnan Zhou, Forest Hills, NY (US)

(73) Assignee: Adobe Inc., San Jose, CA (US)

( * ) Notice: Subject to any disclaimer, the term of this patent is extended or adjusted under 35 U.S.C. 154(b) by 35 days.

(21) Appl. No.: 15/644,424

(22) Filed: Jul. 7, 2017

(65) Prior Publication Data
US 2019/0012843 A1    Jan. 10, 2019

(51) Int. Cl.
*G06T 15/00* (2011.01)
*G06T 19/20* (2011.01)
*G06T 19/00* (2011.01)
*G06F 3/0484* (2013.01)

(52) U.S. Cl.
CPC ............ *G06T 19/20* (2013.01); *G06T 19/006* (2013.01); *G06F 3/04845* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,561,445 A * | 10/1996 | Miwa | ...................... | G06F 3/011 345/163 |
| 5,990,900 A * | 11/1999 | Seago | ...................... | G06T 7/536 345/419 |
| 6,016,153 A * | 1/2000 | Gueziec | ...................... | G06T 9/40 345/441 |
| 6,278,460 B1 * | 8/2001 | Myers | ...................... | G06T 15/06 345/420 |
| 8,194,067 B2 * | 6/2012 | Raby | ...................... | A61C 7/146 345/419 |
| 8,799,821 B1 * | 8/2014 | De Rose | ............. | G06F 3/04842 715/848 |
| 9,183,635 B2 * | 11/2015 | Ramalingam | ........... | G06T 7/543 |
| 2006/0285730 A1 * | 12/2006 | Habets | .................. | G06T 7/0004 382/128 |
| 2007/0109310 A1 * | 5/2007 | Xu | .......................... | G06T 15/02 345/581 |

(Continued)

OTHER PUBLICATIONS

"Pokemon GO gyroscope requirements—a deep view.", http://www.myappviews.com/pokemon-go-gyroscope-deep-view/, Jul. 20, 2016, 7 pages.

(Continued)

*Primary Examiner* — Anh-Tuan V Nguyen
(74) *Attorney, Agent, or Firm* — SBMC

(57) ABSTRACT

Techniques and systems are described in which a visual guide is employed as part of an image processing system to aid composition of a 3D object as part of a digital image. In one example, the image processing system receives inputs that specify an orientation of a plane in the user interface. In response, the image processing system outputs the visual guide in the user interface as corresponding to the plane. The image processing system then orients a 3D object based on the plane defined by the visual guide, to which, rendering techniques are then applied such as physics-based rendering and image-based lighting.

20 Claims, 12 Drawing Sheets

(56) References Cited

U.S. PATENT DOCUMENTS

| | | | |
|---|---|---|---|
| 2008/0007567 A1* | 1/2008 | Clatworthy | G06Q 30/02 345/619 |
| 2008/0253656 A1* | 10/2008 | Schwartzberg | G06K 9/3258 382/181 |
| 2008/0298672 A1* | 12/2008 | Wallack | G06K 9/32 382/154 |
| 2010/0262950 A1* | 10/2010 | Garland | G06F 8/20 717/113 |
| 2011/0150319 A1* | 6/2011 | Ramalingam | G01C 21/3602 382/153 |
| 2011/0164029 A1* | 7/2011 | King | G06F 3/04883 345/419 |
| 2012/0290987 A1* | 11/2012 | Gupta | G06F 3/04815 715/848 |
| 2012/0314030 A1* | 12/2012 | Datta | H04N 13/264 348/44 |
| 2013/0127836 A1* | 5/2013 | Joshi | G06T 11/203 345/419 |
| 2013/0243306 A1* | 9/2013 | Falco, Jr. | G06T 19/006 382/154 |
| 2013/0265297 A1* | 10/2013 | Mueller | G06T 15/20 345/419 |
| 2014/0146050 A1* | 5/2014 | Raab | G06T 15/506 345/426 |
| 2014/0229143 A1* | 8/2014 | Cohen-Or | G06T 17/10 703/1 |
| 2014/0341463 A1* | 11/2014 | Ramalingam | G06T 7/543 382/154 |
| 2014/0368620 A1* | 12/2014 | Li | H04N 5/23293 348/50 |
| 2015/0062125 A1* | 3/2015 | Aguilera Perez | G06T 19/003 345/427 |
| 2015/0070387 A1* | 3/2015 | Schmalstieg | G06T 17/00 345/633 |
| 2015/0317821 A1* | 11/2015 | Ding | G06T 7/00 345/420 |
| 2015/0331970 A1* | 11/2015 | Jovanovic | G06T 15/20 703/1 |
| 2016/0225180 A1* | 8/2016 | Chang | G06T 15/08 |
| 2017/0039722 A1* | 2/2017 | Sheffer | G06T 17/30 |
| 2017/0084037 A1* | 3/2017 | Barajas Hernandez | G06K 9/4671 |
| 2017/0294002 A1* | 10/2017 | Jia | G06T 5/006 |
| 2017/0372499 A1* | 12/2017 | Lalonde | G02B 27/017 |
| 2018/0113596 A1* | 4/2018 | Ptak | G06F 3/04815 |
| 2018/0350099 A1* | 12/2018 | Yerkes | G06T 19/006 |

OTHER PUBLICATIONS

Agarwal,"Ceres Solver", http://ceres-solver.org/, Oct. 8, 2013, 1 pages.

Bouguet,"Camera calibration toolbox for matlab", Oct. 14, 2015, 5 pages.

Caprile,"Using Vanishing Points for Camera Calibration", International Journal of Computer Vision, 4, 127-140 (1990), May 1990, 13 pages.

Criminisi,"Single View Metrology", Int. J. Computer Vision 40, Nov. 2000, 8 pages.

Hoiem,"Geometric Context from a Single Image", Tenth IEEE International Conference on, vol. 1, Oct. 2005, 8 pages.

Izadi,"KinectFusion: Real-time 3D Reconstruction and Interaction Using a Moving Depth Camera", In Proceedings of the 24th Annual ACM Symposium on User Interface Software and Technology (UISR '11)., Oct. 16, 2011, 10 pages.

Karsch,"Automatic Scene Inference for 3D Object Compositing", ACM Transactions on Graphics (TOG) 33, 3, May 2014, 14 pages.

Lee,"Geometric Reasoning for Single Image Structure Recovery", In CVPR, Jun. 2009, 8 pages.

Oyamada,"Single Camera Calibration using partially visible calibration objects based on Random Dots Marker Tracking Algorithm", The IEEE and ACM International Symposium on Mixed and Augmented Reality (ISMAR), 2012, Nov. 2012, 7 pages.

Remondino,"Digital camera calibration methods: considerations and comparisons.", International Archives of Photogrammetry, Remote Sensing and Spatial Information Sciences 36, 5, Sep. 2006, 7 pages.

Saxena,"3-D Depth Reconstruction from a Single Still Image", International journal of computer vision 76, 1, Nov. 1, 2016, 17 pages.

Wang,"Camera Calibration by Vanishing Lines for 3-D Computer Vision", IEEE Transactions on Pattern Analysis and Machine Intelligence, vol. 13, No. 4, Apr. 1991, pp. 370-376.

Zhang,"A Flexible New Technique for Camera Calibration", IEEE Transactions on Pattern Analysis and Machine Intelligence, vol. 22, No. 11, Nov. 2000, pp. 1330-1334.

Zhang,"Microsoft Kinect Sensor and Its Effect", https://www.microsoft.com/en-us/research/publication/microsoft-kinect-sensor-and-its-effect/#, Apr. 1, 2012, 7 pages.

"Combined Search and Examination Report", GB Application No. 1808407.9, Jan. 23, 2019, 5 pages.

* cited by examiner

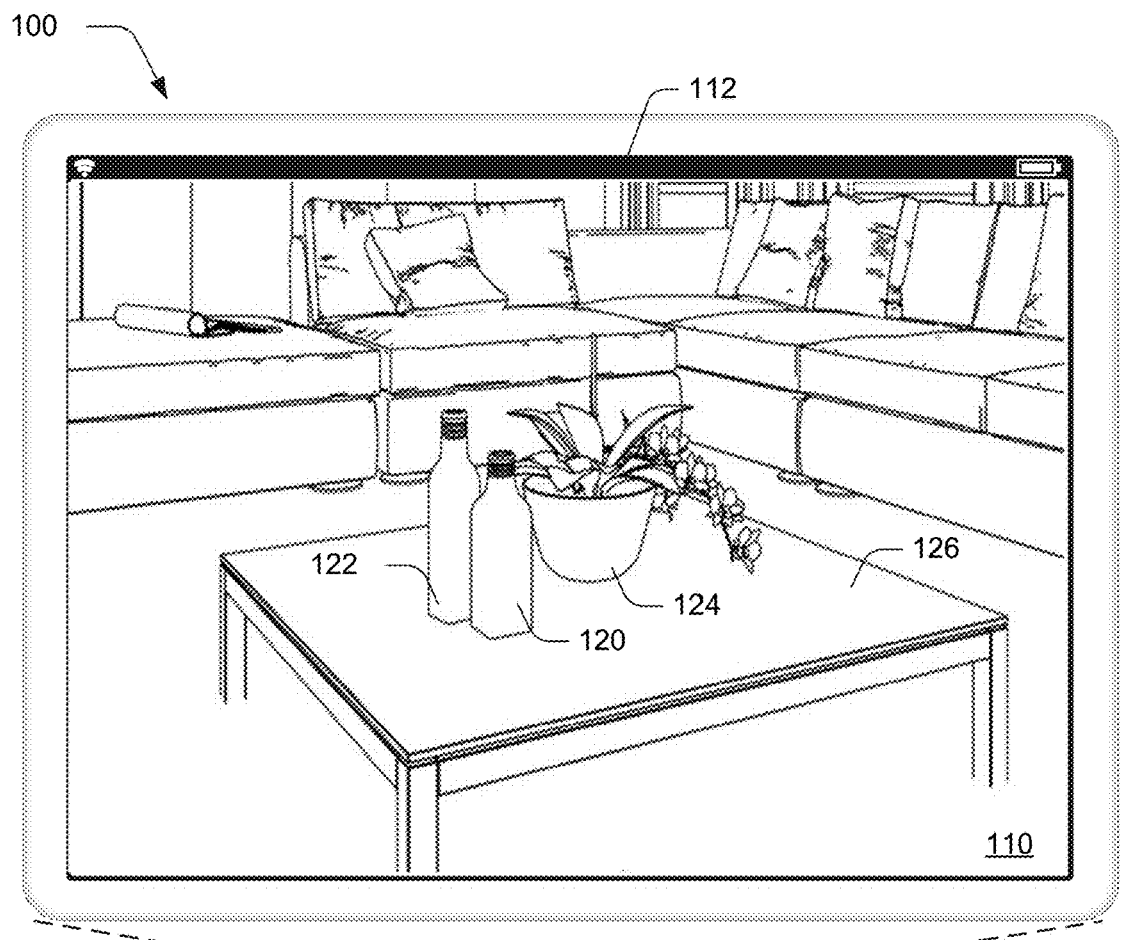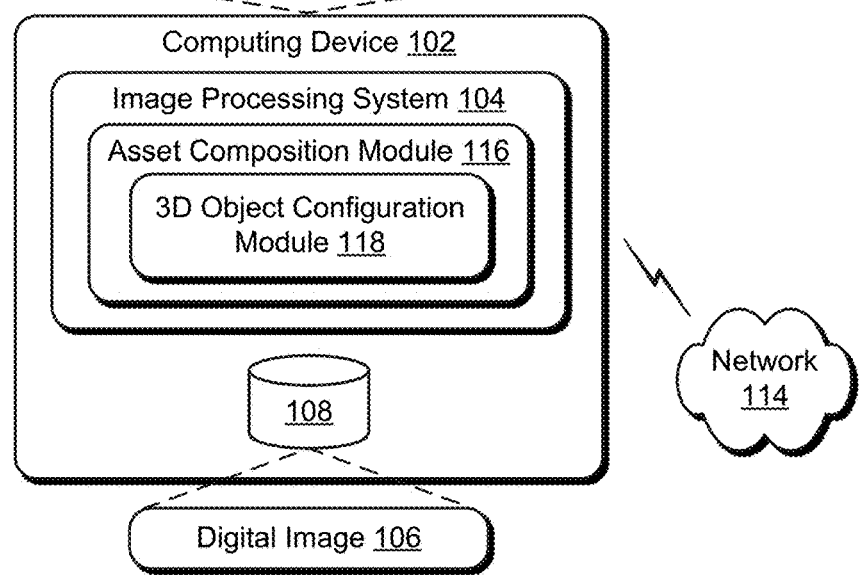
Fig. 1

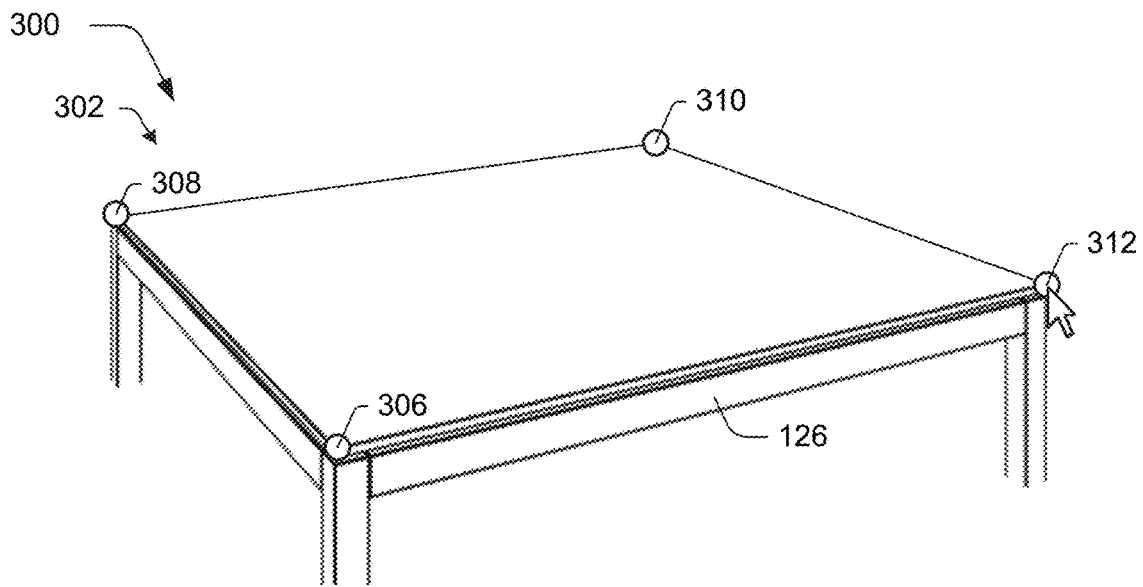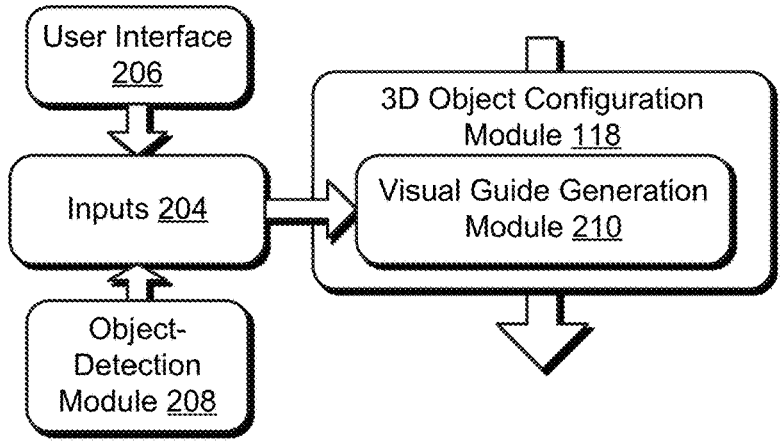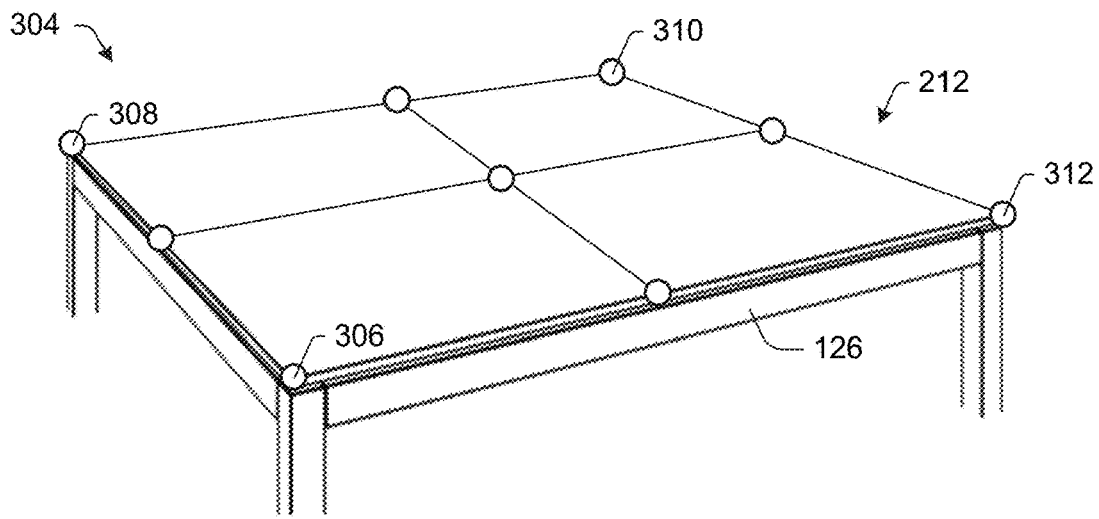
Fig. 3

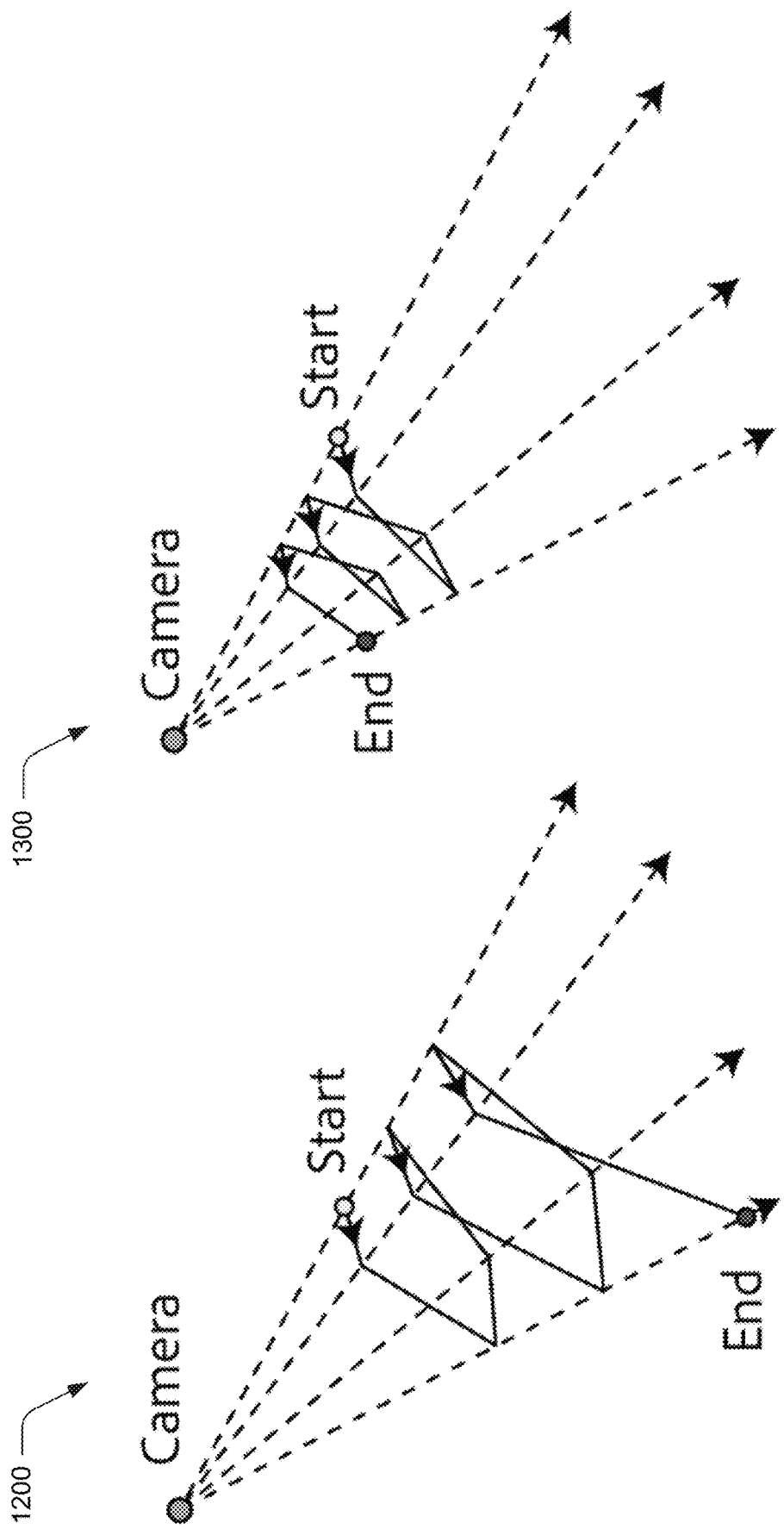

3D OBJECT COMPOSITION AS PART OF A 2D DIGITAL IMAGE THROUGH USE OF A VISUAL GUIDE

BACKGROUND

Composition of a three-dimensional (3D) object as part of a two-dimensional digital image is a common technique used for movie special effects, product mockups for digital marketing content, and so forth. A digital marketing professional, for instance, may interact with an image processing system to insert a product as a 3D object (e.g., a shoe) in a background image for use in an advertisement, e.g., for a banner ad. This functionality is made available through advances of image processing systems to support physics-based rendering and image-based lighting. These advances enable the image processing system to compose the 3D object in a visually pleasing manner as part of the 2D digital image due to realistic application of light and color effects to the 3D object based on an environment of the 2D digital image.

However, conventional techniques used to orient the 3D object in relation to the 2D digital image by an image processing system are inefficient and tedious for sophisticated users and difficult for novice users. This results in an inefficient use of computational resources by the image processing system that employs these conventional techniques due to repeated corrections that are applied to the orientation and a result that lacks accuracy, e.g., does not appear realistic when viewed.

Conventional techniques, for instance, may be grouped into five categories including manual rotation based techniques, vanishing point based techniques, marker based techniques, techniques that rely on external data in addition to the digital image (e.g., depth field or gyroscope), and machine learning based techniques. In a conventional manual rotation technique, the 3D object is oriented with respect to the 2D digital image through use of a trackball. However, this technique in practice is often considered tedious by professional users and prone to error by novice users because an incorrect center of rotation causes unexpected and unnatural results.

In a conventional vanishing point technique, orthogonal groups of parallel lines in the 2D digital image are used to determine vanishing points, which are sufficient to recover intrinsic camera parameters, e.g., to define a horizon in the image. However, in practice the 2D digital image may not contain orthogonal groups of parallel lines (e.g., for a "close up") and/or the parallel lines result in vanishing points that are of such a distance from a boundary of the image that errors are introduced. In addition, orthogonality between different groups of parallel lines may not hold in some instances (e.g., different objects that define these lines are not orthogonal to each other) and thus also introduce errors. Further, conventional vanishing point techniques may rely on the user to trace the parallel lines, which is both tedious and may introduce inaccuracies. On the other hand, automated edge detection techniques can partially automate the tracing process but also introduce errors as a result of foreground textures and noise in the 2D digital image.

In a conventional marker based technique, a marker of known dimension is included as part of the 2D digital image. Intrinsic and extrinsic camera parameters are then extracted from the 2D digital image by the image processing system based on the marker, such as for camera calibration, visual effects, and augmented reality. In practice, however, these markers are typically not available.

In a conventional external data based technique, data obtained from sensors external to an image sensor of a digital image device is used to provide additional information, such as depth sensors, time-of-flight cameras, structured grid techniques, and so forth. Although this data may improve accuracy, these techniques also introduce additional challenges. A gyroscope, for instance, may determine an orientation of the capturing digital image device but not arbitrary planes in the image scene. An output of a depth sensor is typically considered noisy and has low resolution and thus may also introduce errors. Thus, these challenges may introduce inaccuracies and unrealistic results.

In conventional machine learning based techniques that are applicable for a single digital image, these techniques often rely on strict assumptions about characteristics of the digital image that, if not met, result in errors. Examples of these assumptions include type of digital image (e.g., indoor versus outdoor), type of planes to be recovered from the digital image (e.g., ground plane or camera axis aligned planes), and so forth. Thus, these conventional techniques may fail due to a variety of challenges and result in inefficient consumption of computational resources, e.g., due to repeated application of these conventional techniques.

SUMMARY

Techniques and systems are described in which a visual guide is employed as part of an image processing system to aid composition of a 3D object as part of a digital image. The visual guide provides a minimalistic and computationally efficient technique (e.g., may be executed in real time within a browser) to add the 3D object as part of the digital image to arrive at a visually pleasing result. In one example, the image processing system receives inputs that specify an orientation of a plane in the user interface. The inputs may be provided through user interaction with a user interface (e.g., by "clicking" on corners of an object within the digital image) or automatically and without user intervention using edge and corner detection techniques. In response, the image processing system outputs the visual guide in the user interface as corresponding to the plane, e.g., visualized as a mat.

User interaction is also supported to modify the orientation of the visual guide such that the orientation of the plane defined by the visual guide is visually consistent with an image scene captured by the digital image. The image processing system then orients a 3D object based on the plane defined by the visual guide, to which, rendering techniques are then applied such as physics-based rendering and image-based lighting. In this way, the visual guide provides an intuitive and computationally effective mechanism to guide orientation of 3D objects as part of a digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ composition techniques described herein.

FIG. 3 depicts an output example of the visual guide in response to user inputs that define a plane in relation to a tabletop of a digital image.

FIGS. 10-13 illustrate considerations involved in determination of orientation of the visual guide with respect to a digital image.

DETAILED DESCRIPTION

Overview

Figure 2:
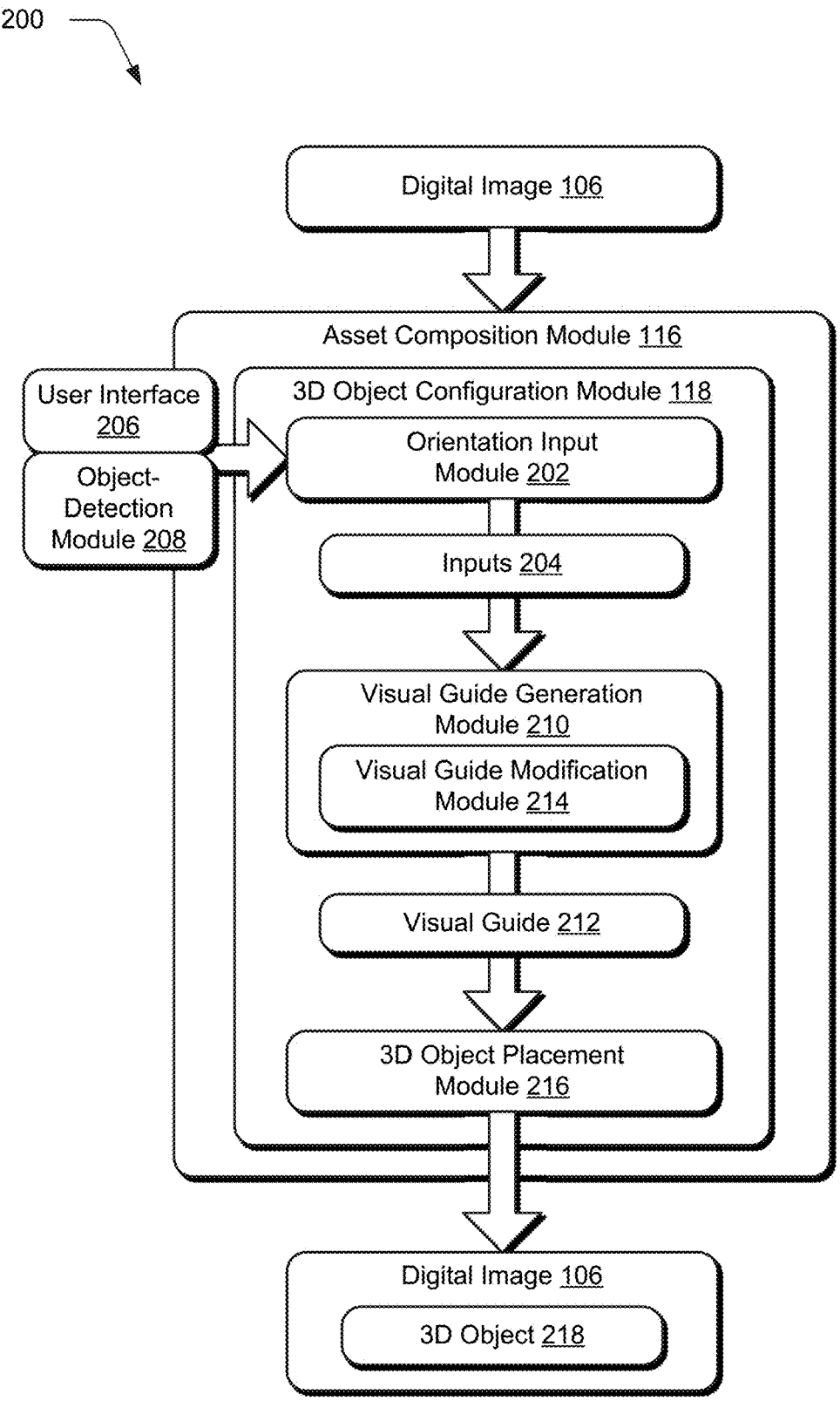
FIG. 2 depicts a system in an example implementation showing operation of a 3D object configuration module of FIG. 1 in greater detail.

Techniques and systems are described to aid compositing of a 3D object by an image processing system as part of a two-dimensional (2D) image. The visual guide provides a minimalistic and computationally efficient technique (e.g., may be executed in real time within a browser) to add the 3D object as part of the digital image to arrive at a visually pleasing result. To do so, a visual guide is generated based on inputs received by the image processing system, which may be defined manually by a user through interaction with a user interface or automatically through edge and/or corner detection. The image processing system, for instance, may receive inputs generated through user interaction with a user interface to specify four corners of a rectangular region in a background of a digital image, e.g., by "clicking" on four corners of a tabletop, to follow a floor, and so forth.

The image processing system then generates a visual guide for output in the user interface in conjunction with the digital image, e.g., visualized as a "mat." Once the visual guide is generated, additional user inputs may be received by the image processing system to modify the visual guide. This may include resizing, updating (e.g., adjusting the corners to change an orientation of the visual guide in three dimensional space), sliding the visual guide (e.g., forward, back, left, right), lifting the visual guide (e.g., such that a viewpoint appears above or below a plane of the guide), and so forth. In this way, the visual guide may be readily modified based on user inputs to "look visually correct" in relation to an image scene of the two-dimensional image even though depth information or other information that is usable to define three-dimensional relationships may not be available for the two-dimensional image.

The visual guide is then employed by the image processing system to compose a 3D object as part of the 2D digital image. The visual guide, as described above, defines a plane in relation to the 2D digital image. Accordingly, a 3D object is oriented by the image processing system automatically and without user intervention to the plane defined by the visual guide. As part of this, physics-based rendering and image-based lighting may also be employed such that the 3D object, when composed as part of the 2D digital image based on the plane of the visual guide, looks realistic. In this way, the 3D object may "rest upon" the visual guide (e.g., visualized as a placemat) and appear visually consistent with an image scene of the 2D digital image in a computationally efficient and intuitive manner with minimal processing resources.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 14.

The computing device 102 is illustrated as including an image processing system 104. The image processing system 104 is implemented at least partially in hardware of the computing device 102 to process and transform a digital image 106, which is illustrated as maintained in storage 108 of the computing device 102. The digital image 106, for instance, may be configured as a two-dimensional digital image, for which, data is not directly available that defines a relationship of objects in an image scene in relation to each other along a "z" axis. The techniques described herein are also applicable to 3D digital images, such as to serve as an aide to increase accuracy of composition of a 3D object within an image scene.

Examples of processing by the image processing system 104 include creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the image 106 is illustrated as an asset composition module 116. The asset composition module 116 is representative of functionality of the computing device 102 (e.g., implemented by a processing system and computer-readable storage medium) to composite objects (e.g., 3D objects) as part of a two-dimensional background of a digital image 106. This may include use of techniques to process the 3D digital object to be visually consistent with the digital image. Examples of these techniques include physics-based rendering and image-based lighting. In physics-based rendering, for instance, the asset composition module 116 may take into account diffusion, reflection, translucency, transparency, energy conservation, Fresnel effects, and micro-surfaces to define how light is transported within an image scene of the digital image 106. Image-based lighting is used to take into account light sources within the image scene, e.g., the sun, lamps, and so forth that are a source of this light transport.

The asset composition module 116 is also illustrated as including a 3D object configuration module 118. The 3D object configuration module 118 is implemented at least partially in hardware of the computing device 102 (e.g., processing system and computer-readable storage media) to support 3D object composition as part of the digital image 106 through use of a visual guide. The 3D object configuration module 118, for instance, may be used to composite 3D objects, such as bottles 120, 122 and a plant 124 in relation to an object already included as part of the digital image 106 (e.g., a tabletop 126) such that the 3D objects appear visually consistent with the digital image 106. To do so, the 3D object configuration module 118 employs a visual guide that is usable to define a plane to orient the 3D object in relation to the image scene of the digital image 106, such as to a tabletop 126. In this way, the 3D object configuration module 118 provides a minimalistic and computationally efficient technique to arrive at a visually pleasing result, an example of which is described in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

3D Object Composition as Part of a 2D Digital Image

Figure 4:
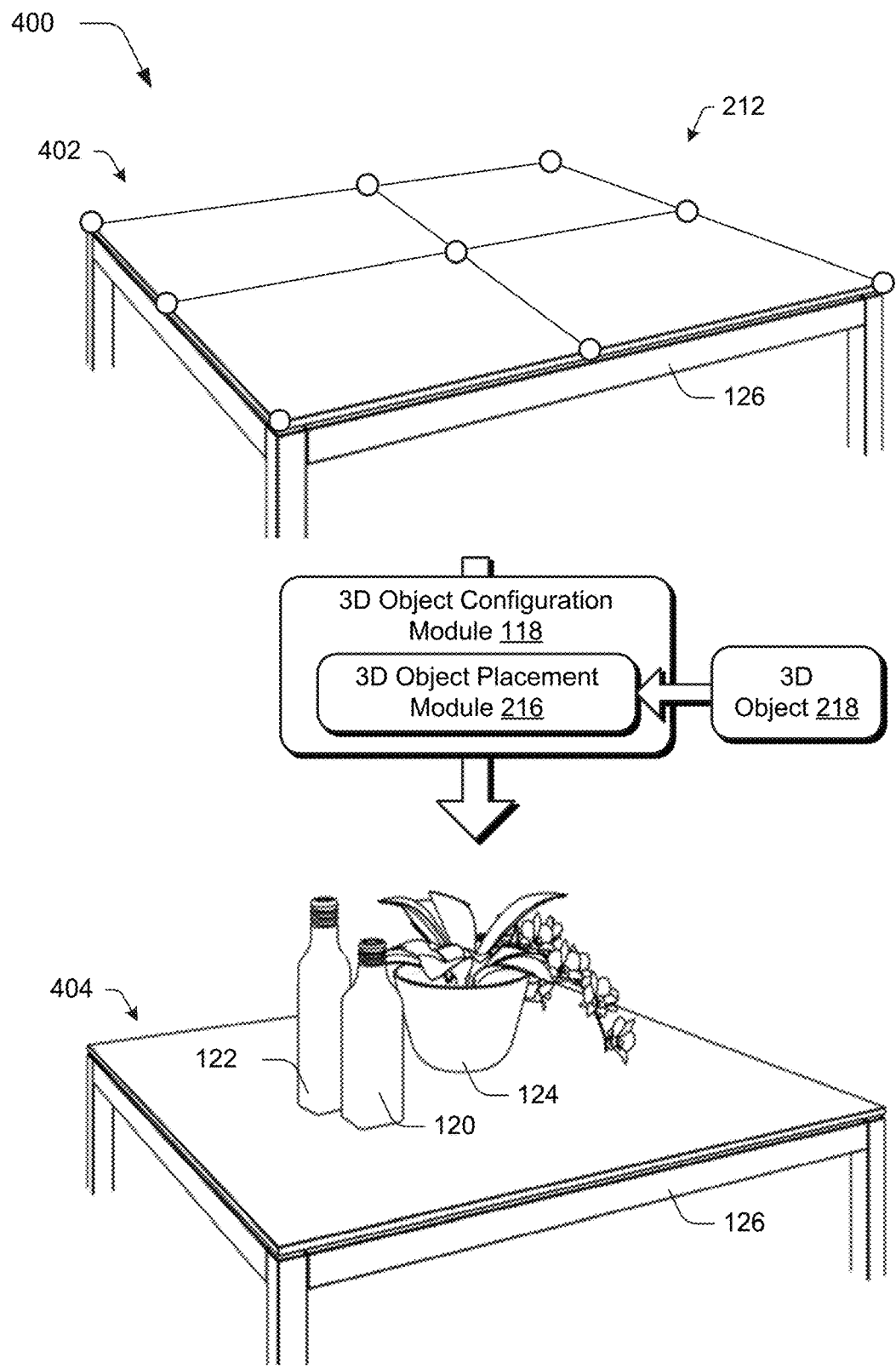
FIG. 4 depicts an example of use of the visual guide of FIG. 4 to orient a 3D object in relation to the tabletop of the digital image.
Figure 5:
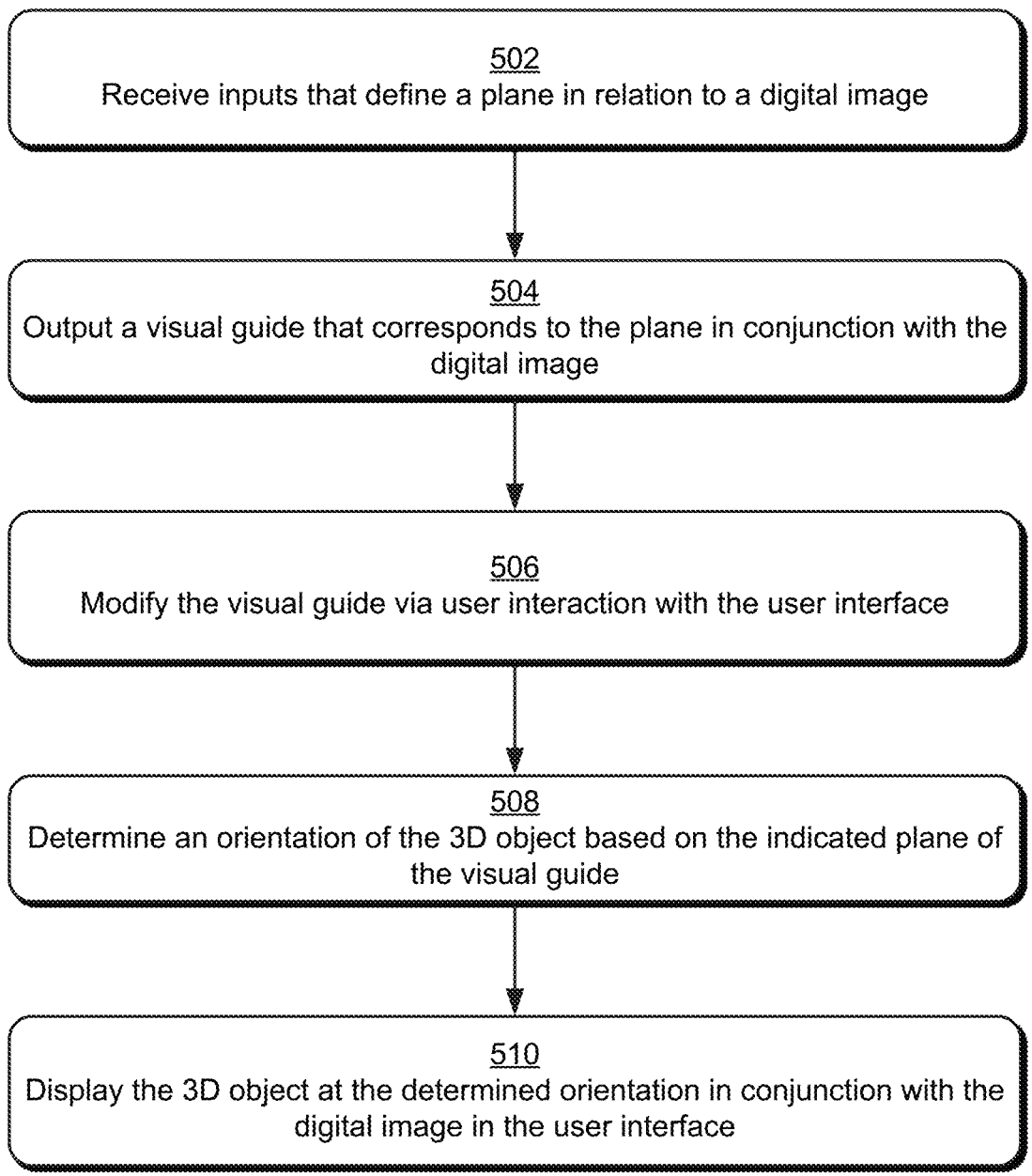
FIG. 5 is a flow diagram depicting a procedure in an example implementation in which a visual guide is output to aid composition of a 3D object as part of a digital image.

FIG. 2 depicts a system 200 in an example implementation showing operation of the 3D object configuration module 118 of FIG. 1 in greater detail. FIG. 3 depicts an output example 300 of the visual guide in response to user inputs that define a plane in relation to the tabletop 126 of the digital image 106. FIG. 4 depicts an example of use of the visual guide of FIG. 4 to orient a 3D object in relation to the tabletop 126 of the digital image 106. FIGS. 3 and 4 are depicted using respective first and second stages 302, 402, 304, 404. FIG. 5 depicts a procedure 500 in an example implementation in which a visual guide is output to aid composition of a 3D object as part of a digital image.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made interchangeably to FIGS. 1-5.

To begin in this example, the asset composition module 116 receives a digital image 106. The digital image is a two-dimensional digital image 106 in this example in that depth information (e.g., a "z" direction) is not directly available from the image, itself, to define a relationship of objects in an image scene captured by the digital image 106. In other words, in this example depth information of an image scene is not captured along with the digital image 106 and thus the digital image 106 is configured in two dimensions.

The digital image 106 is then provided as an input to a 3D object configuration module 118 to compose a 3D object as part of the digital image 106. To do so, an orientation input module 202 receives inputs 204 that define a plane in relation to the digital image 106 (block 502). The inputs 204 may be received in a variety of ways, such as resulting from user interaction with a user interface 206, automated techniques implemented by an object-detection module 208 to locate edges or corners of an object within the digital image 106, and so forth.

As shown at the first stage 302 of FIG. 3, for instance, inputs 306, 308, 310, 312 may be received via a user interface 206 or automatically and without user intervention from an object-detection module 208. In the example of the user interface 206, a user specifies four locations using inputs 306, 308, 310, 312 that define a rectangle as a plane within the user interface. This may be performed in a defined order (such as a clockwise or counterclockwise order) or learned by the object-detection module 208 from any order by trying each possible permutations of user clicks and keeping the result that introduces the least amount of error. In this example, the tabletop 126 acts as a user aide and thus objects included in the digital image 106 may be used to increase accuracy in definition of the plane. Other examples of user interaction with a user interface 206 are also contemplated, such as to click-and-drag to define an initial shape which is subsequently modified as further described in the following discussion.

In the automated example of the object-detection module 208, edges and/or corners identified by the module are used as a basis to define the plane with respect to the digital image. Edge detection techniques, for instance, may be employed in which discontinuities in brightness of pixels within the digital image 106 are used to define edges, e.g., between the tabletop 126 and a background of the digital image 106. From these edges, the object-detection module 208 may then construct a plane as defined by the inputs 204.

The inputs 204 are then provided to a visual guide generation module 210 and used as a basis to generate a visual guide 212 that corresponds to the plane and output in conjunction with the digital image 106 (block 504). As shown at the second stage 304 of FIG. 3, for instance, the visual guide 212 is output as a grid that connects the inputs 306-312. The visual guide 212, as a grid, thus defines a relationship of the defined plane to the digital image 106, which may then be modified if desired.

Figure 6:
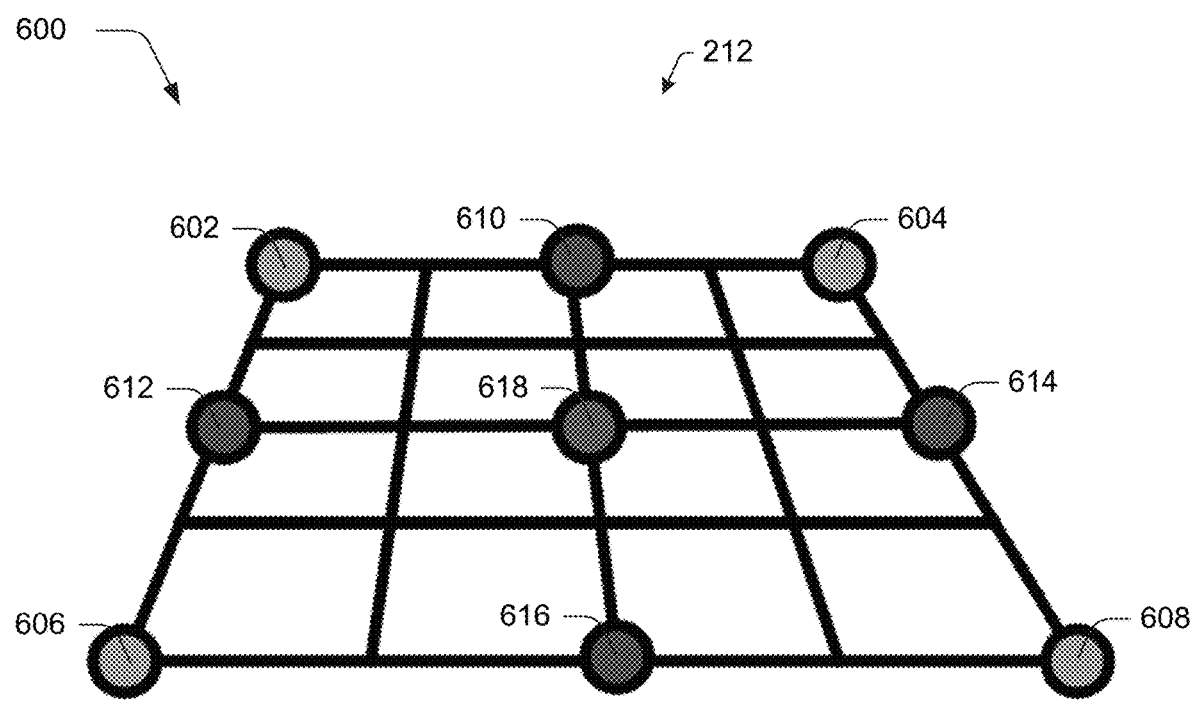
FIG. 6 depicts an example implementation showing the visual guide as a mat in greater detail.

FIG. 6 depicts an example implementation 600 showing the visual guide 212 in greater detail as a mat. The visual guide 212 includes a variety of visual element types, each of which supports different user interaction techniques. Examples of visual element types include four corner nodes 602, 604, 606, 608 that correspond to the inputs 306-312, four edge nodes 610, 612, 614, 616, and one center node 618 that are connected to form a grid as the visual guide 212. Spacing of the grid provides a visual cue for depth foreshortening. Other visual cues may also be supported, an example of which is described as follows.

Figure 7:
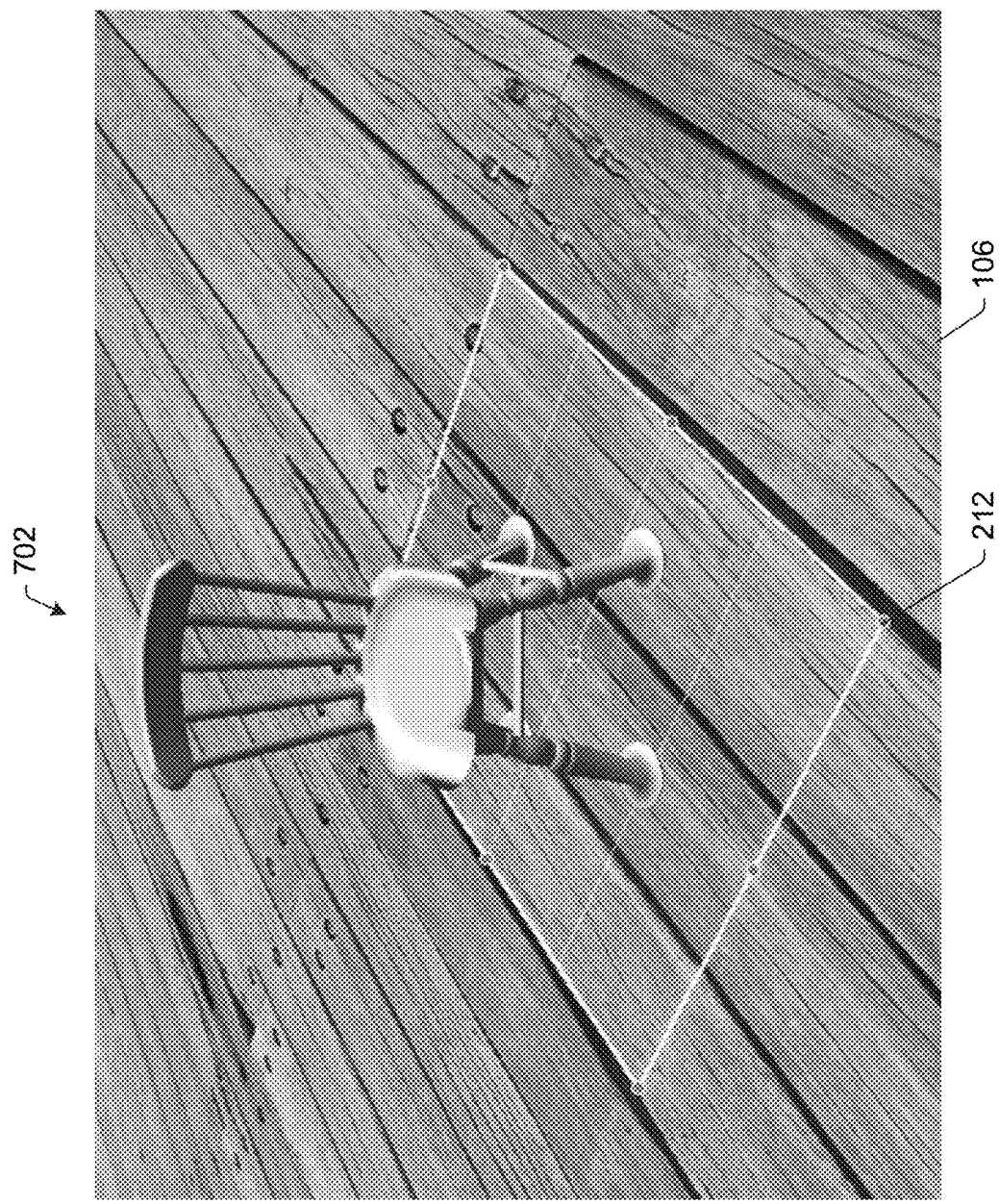
FIG. 7 depicts an example implementation in which the visual guide includes another visual element as a sample 3D object.

FIG. 7 depicts an example implementation 700 in which the visual guide 212 includes another visual element as a sample 3D object 702. The sample 3D object 702 in this example is not the 3D object that is to be composed as part of the digital image 106, but rather is chosen as an example to aide a perception of orientation of the visual guide 212 with respect to the image. Other examples are also contemplated in which the sample 3D object 702 is the 3D object, e.g., a lower resolution version that may or may not have physics-based rendering and image-based lighting effects applied thereto.

The sample 3D object 702, as a chair, is chosen in this example because most users have a good intuition about how a chair is to look with respect to a background of the digital image 106. Thus, the sample 3D object 702 serves as visual guide to aid a user in understanding an orientation of the visual guide 212 (e.g., the mat) with respect to an image scene of the digital image 106. In an implementation, a size of the sample 3D object 702 is automatically determined based on a size of the visual guide 212.

The visual guide 212, once output, is configured to support user interaction to modify the guide, functionality of which is represented by a visual guide modification module 214. As previously described, the visual elements of the visual guide 212 support different types of user interaction. Accordingly, the visual guide may be modified via user interaction with the user interface (block 506) to orient and refine orientation of the visual guide with respect to the digital image 106.

Figure 8:
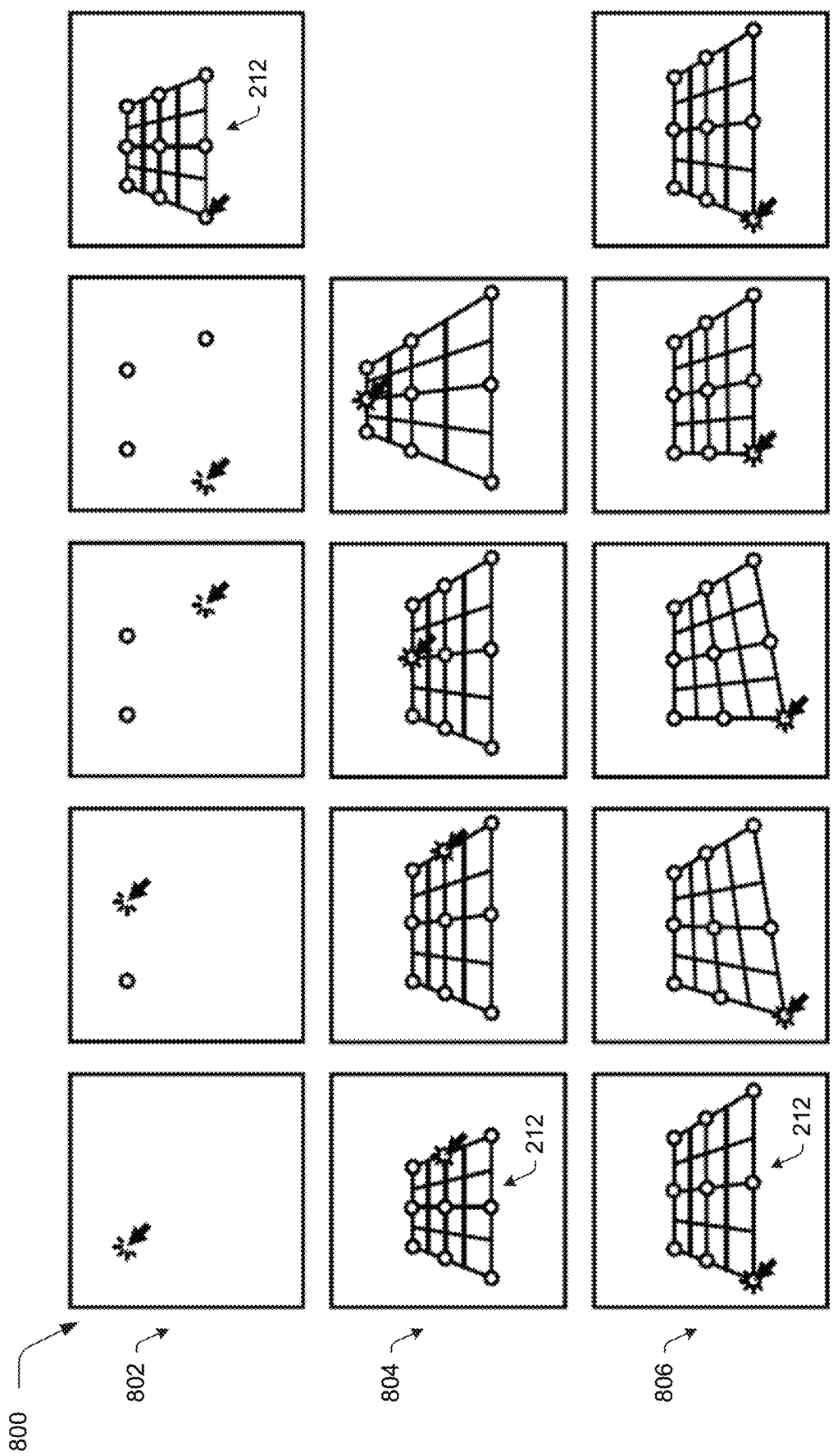
FIG. 8 depicts an example implementation of create, resize, and update interactions usable to create and then modify the visual guide.

FIG. 8 depicts an example implementation 800 of create, resize, and update interactions 802, 804, 806 usable to create and then modify the visual guide 212. In a create user interaction 802, user inputs are received to specify positioning of four corners of the visual guide 212, e.g., by "clicking" a user interface, use of a gesture detected using touchscreen functionality, and so forth. The user inputs thus specify the four corner nodes 602, 604, 606, 608 as previously described in relation to FIG. 6.

Once created, a resize interaction 804 may be used to modify an overall size of the visual guide 212. This is illustrated in FIG. 8 by selecting and dragging edge nodes 610, 612, 614, 616 of FIG. 6, which causes corresponding movement of adjacent corner nodes to resize the grid.

An update interaction 806 may also be supported by the visual guide modification module 214. The update interaction 806 supports user inputs to reposition (e.g., drag) corner nodes 602-608. In response, the visual guide modification module 214 updates the visual guide 212 in real time in the user interface, example of which are illustrated sequentially in FIG. 8.

Figure 9:
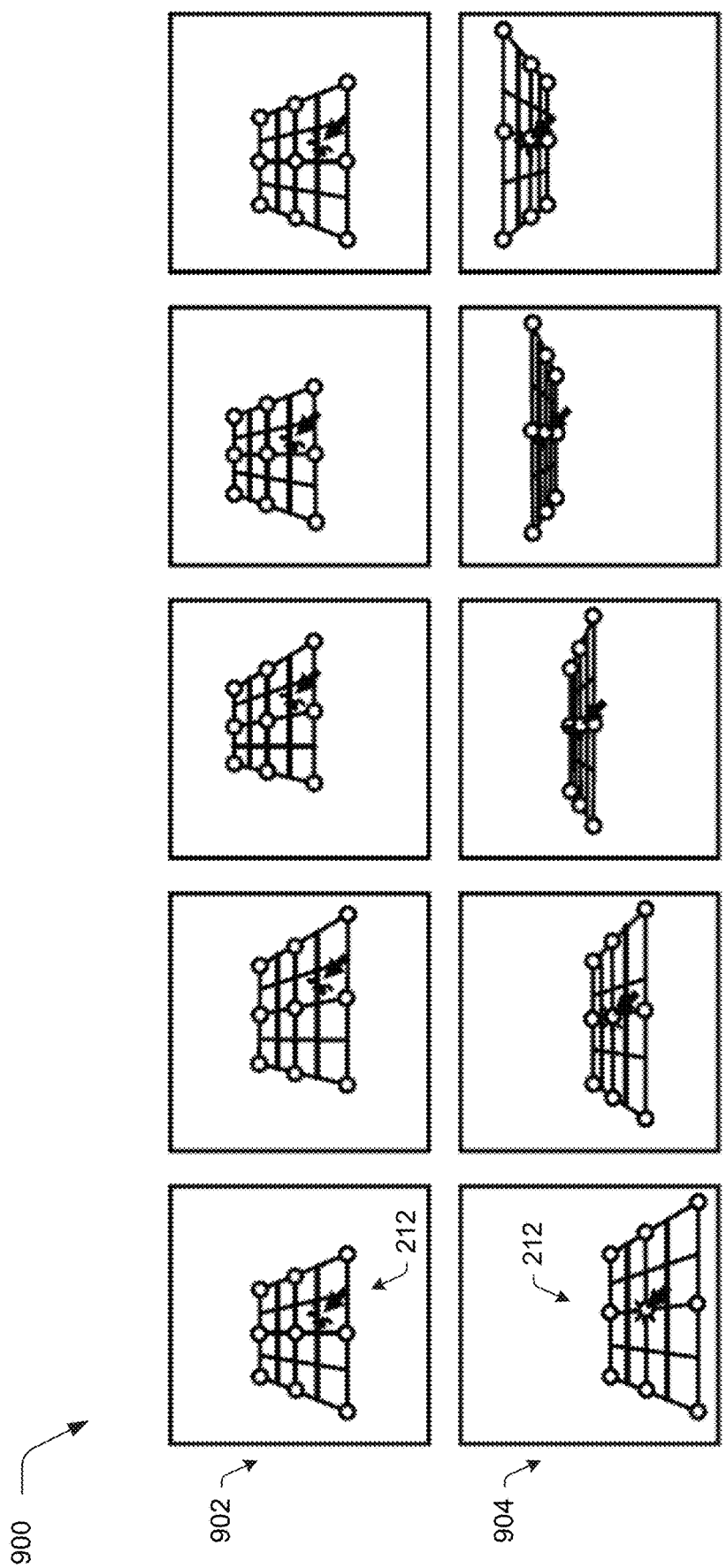
FIG. 9 depicts an example implementation of slide and lift interactions usable to modify the visual guide.

FIG. 9 depicts an example implementation 900 of slide and lift interactions 902, 904 usable to modify the visual guide 212. In a slide interaction 902, a user selection is received involving a portion of the visual guide 212 that is not a node, e.g., lines of a grid that connect the nodes. In response, the visual guide modification module 214 moves the visual guide a corresponding direction as a whole without resizing or reorienting. This support an ability to define the visual guide 212 at a first location within the digital image 106 (e.g., at which it is relatively easy to define a rectangle based on an object at that location) and then reposition the visual guide 212 to another location with respect to the digital image 106, e.g., which may not have clear cues for tracing.

The lift interaction 904 is performed through user interaction with the center node 618 of FIG. 6 to lift or drop the visual guide 212 in three-dimensional space "above" or "below" a point of view (e.g., position of a "camera") to capture the digital image 106 of the image scene. A variety of other user interactions may also be supported.

Returning again to FIG. 2, the visual guide 212 is then received by a 3D object placement module 216. The 3D object placement module 216 is configured to composite the 3D object 218 based on a plane defined by the visual guide 212. To do so, an orientation of a 3D object is determined by the 3D object placement module 216 based on the indicated plane of the visual guide (block 508). The 3D object is then caused by the 3D object placement module 216 to be displayed at the determined orientation in conjunction with the digital image in the user interface (block 510).

As shown at the first stage 402 of FIG. 4, for instance, the visual guide 212 is positioned as desired by a user with respect to a tabletop 126. The 3D object placement module 216 then receives a 3D object 218 as data and orients the object with respect to the plane, examples of which include the bottles 120, 122 and plant 124. The visual guide 212 is then removed, leaving the 3D object 218 as composited with the digital image 106. The 3D object placement module 216 may also perform additional techniques to visually modify the 3D object 218 as part of composition, including physics-based rendering and image-based lighting.

In an implementation, the visual guide 212 may remain (e.g., for a defined amount of time before or after application of physics-based rendering and/or image-based lighting) to permit further modification to the visual guide and defined plane and thus how the 3D object is composited as part of the digital image 106. The 3D object placement module 216, for instance, may first display the 3D object 218 at the orientation and then wait to apply physics-based lighting and other rendering techniques to conserve computational resources until a desired orientation is achieved.

Figure 10:
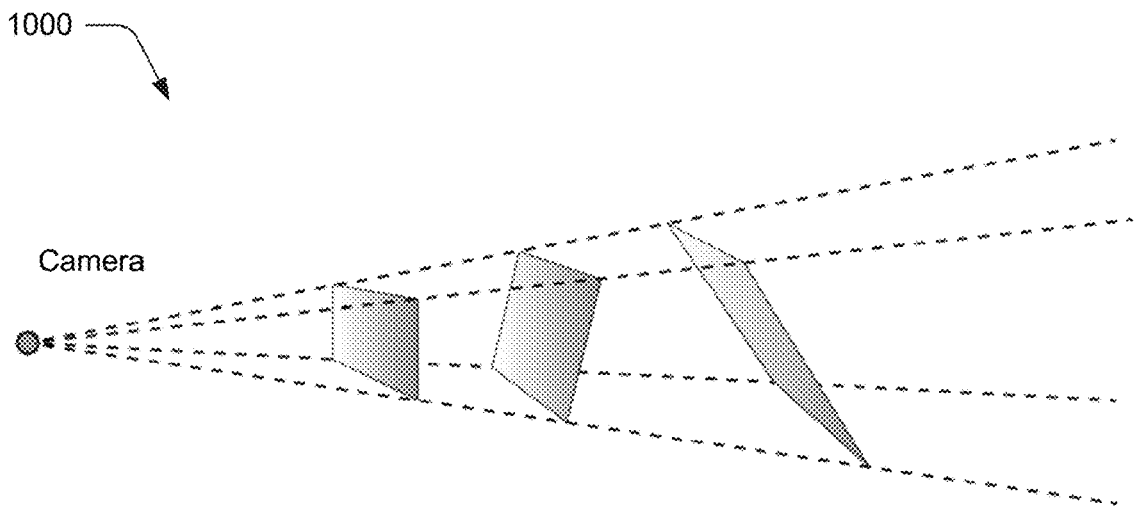

The user interactions described above rely on an ability to compute 3D coordinates of the visual guide 212 from inputs 206. However, such 2D to 3D un-projection is known to be mathematically ill posed in that there exists an infinite number of 3D rectangles to project onto the same four image points, an example 1000 of which is illustrated in FIG. 10.

Accordingly, assumptions may be employed by the 3D object configuration module 118 to address this challenge. Examples of these assumptions include (1) a known camera projection model; and (2) known depth at one corner of the visual guide 212. Using a known camera projection model, the 3D object configuration module 118 may recover a camera position with respect to an image scene captured by the digital image 106. Without loss of generality, let the camera be located at the origin O.

Figure 11:
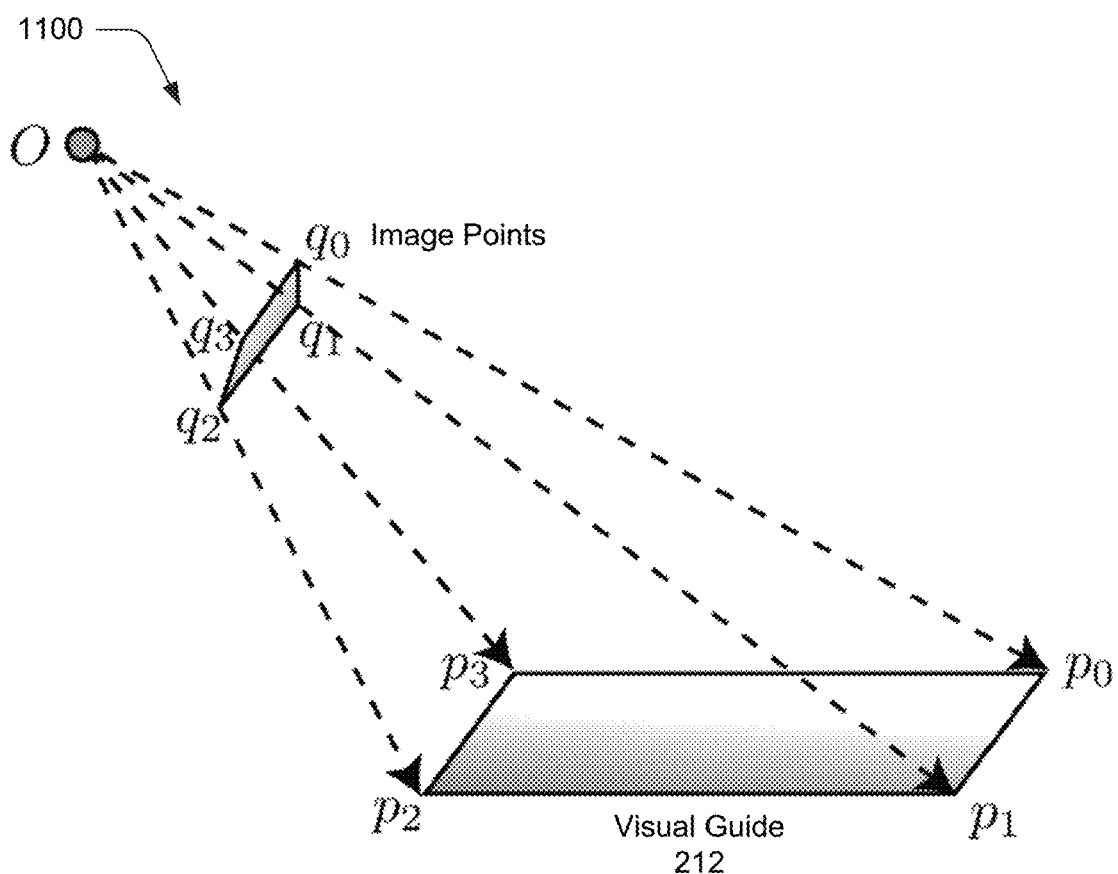

The four image points may be expressed in camera coordinates as $q_i := (x_i, y_i, z_i)$ where $i \in \{0, 1, 2, 3\}$. The image points together with the camera position define four rays radiating from the camera that pass through each of the image points. Therefore, 3D coordinates of each corner of the mat lie somewhere along these rays as shown in the example system 1100 of FIG. 11. Accordingly, a task is undertaken in the following discussion to determine how far along each ray the corners of the visual guide 212 lie. In other words, a depth value di is determined such that the 3D coordinates of a visual guide's 212 corner are defined as $p_i := (q_i - O)d_i = q_i d_i$.

In this example, the visual guide 212 is configured as a 3D rectangle (i.e. all corners are 90°), and as such four quadratic orthogonality constraints: $(p_{i+1} - p_i) \cdot (p_{i-1} - p_i) = 0$ may be extracted. Furthermore, the known depth, $\bar{d}$, of one of mat corners from the above assumptions may also be extracted. For example, let the depth of the first corner be $d_0 = \bar{d}$. The problem may then be defined as finding the values of $d_i$ that satisfy $$(p_{i+i} - p_i) \cdot (p_{i-1} - p_i) = 0 \; i \in \{0,1,2,3\} d_0 = \bar{d}$$

The 3D object placement module 216 may then compute a solution by solving a nonlinear least square problem with standard solvers such as Ceres Solver. In another example, an iterative geometric algorithm is employed by the 3D object placement module 216 that has no external library dependency and can be coded up with JavaScript in less than 30 lines. This lightweight algorithm thus supports real time user interaction within a web browser.

The geometric algorithm is based on the observation that if the location of two adjacent nodes is known, say $p_0$ and $p_i$, the next point, $p_2$, belong to an orthogonal plane to the vector $(p_1 - p_0)$ that passes through $p_1$. The depth $d_2$ and thus the location $p_2$ are then derived from this orthogonality condition:

$$(p_1 - p_0) \cdot (p_2 - p_0) = 0$$
$$(p_1 - p_0) \cdot p_2 = (p_1 - p_0) \cdot p_0$$
$$d_2 = \frac{(p_1 - p_0) \cdot p_0}{(p_1 - p_0) \cdot q_2}$$

Therefore, with knowledge of $d_i$ and $d_{i+1}$ the value of $d_{i+2}$ may be computed. Since the value of $d_0 = \bar{d}$ is known, the algorithm is employed by the 3D object placement module 216 to first make a guess for a value of $d_1$ (e.g., $d_1 = \bar{d}$), and computes $d_2$. With $d_1$ and $d_2$ computed, the 3D object placement module 216 may then compute $d_3$. Lastly, with $d_2$ and $d_3$, the 3D object placement module 216 returns back to the ray that acted as a starting point and re-computes the depth $d_0$, which may be different from $\bar{d}$. The values of $d_3$ and $d_0$ may be used by the 3D object placement module 216 to update the guessed value of $d_i$.

As illustrated in the example implementations 1200, 1300 of FIGS. 12 and 13, continued iterations may cause the depth values to spiral out toward infinity or spiral in to converge to the trivial solution of zero depth. Accordingly, the 3D object placement module 216 may employ another fixed point to the iterations: the solution of the first assumption above.

In order to find the fixed point, the depth vector $(d_0, d_1, d_2, d_3)$ is rescaled to $$\left( \bar{d}, d_1 \frac{\bar{d}}{d_0}, d_2 \frac{\bar{d}}{d_0}, d_3 \frac{\bar{d}}{d_0} \right)$$

after updating $d_i$ and another iteration is initiated. Two different error measures may be used to measure convergence: orthogonality error ($e_O$) and planarity error ($e_p$).

$$e_o := \sum_i \left( \frac{(p_{i+1} - p_i) \cdot (p_{i-1} - p_i)}{\|p_{i+1} - p_i\| \cdot \|p_{i-1} - p_i\|} \right)^2$$

$$e_p := \sum_i \left( \frac{c \cdot n}{q_i \cdot n} - d_i \right)^2$$

where $c := \frac{1}{4} \Sigma p_i$ is the center of the visual guide 212, and $n := (p_i - p_0) \times (p_3 - p_0)$ is the visual guide's 212 estimated normal. The iterations are stopped when both error measures are below a given threshold (e.g., $10^{-6}$) or the max number of iterations have been reached. In practice, the fixed point iterative algorithm typically converges within 10 to 20 iterations when a solution exists. The max number of iterations also guard the algorithm against overuse of computational resources when (1) has no solution (e.g. when the 4 image points forms a concave quad). Accordingly, in this implementation the maximum number of iterations is set to twenty although other examples are also contemplated.

In this way, the 3D object configuration module 118 may determine an orientation based on the indicated plane of the visual guide and use this orientation to composite the 3D object 218 to modify the digital image 106. Further, this may be performed without requiring depth information associated with the digital image 106 and thus is applicable to a wide range of two-dimensional digital images.

Example System and Device

Figure 14:
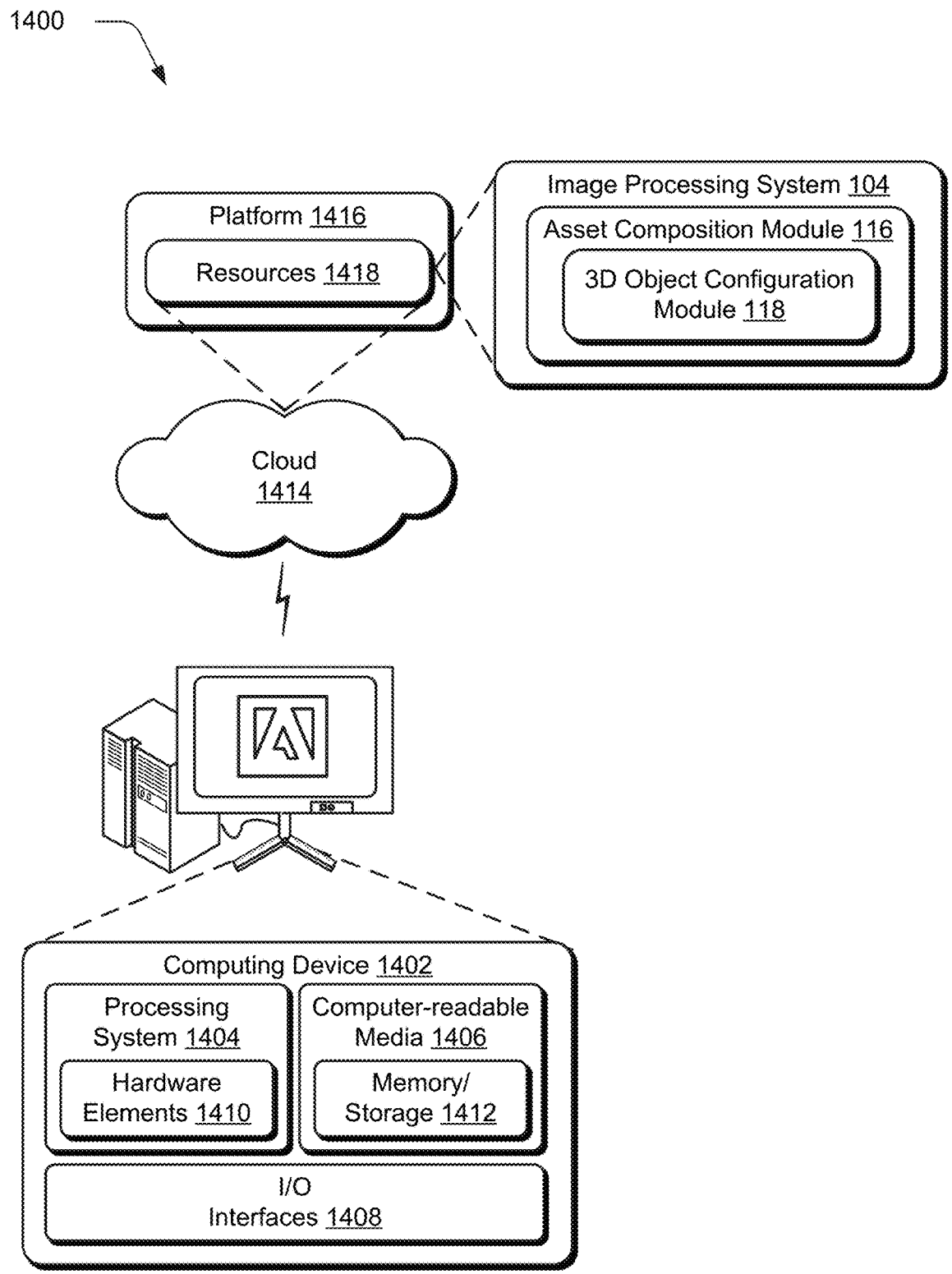
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the image processing system 104, asset composition module 116, and the 3D object configuration module 118. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers)

and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to perform composition of a three-dimensional (3D) object as part of a two-dimensional digital image, a method implemented by at least one computing device, the method comprising:
   receiving, by the at least one computing device, inputs in relation to the two-dimensional digital image;
   defining, by the at least one computing device, rays corresponding to each respective input that radiate from an estimated camera position and pass through a point corresponding to the respective input;
   determining, by the at least one computing device, a plane in relation to the inputs based on the rays and an orthogonality condition, the plane determined when an orthogonality error and a planarity error are below a threshold value;
   outputting, by the at least one computing device, a visual guide in a user interface, the visual guide indicating the plane in conjunction with the two-dimensional digital image;
   determining, by the at least one computing device, an orientation of the 3D object based on 3D coordinates of the plane of the visual guide; and
   displaying, by the at least one computing device, the 3D object at the orientation in conjunction with the two-dimensional digital image in the user interface.

2. The method as described in claim 1, wherein the inputs are input manually through user interaction with the user interface.

3. The method as described in claim 2, wherein the inputs specify four corners of the plane in relation to the two-dimensional digital image in the user interface.

4. The method as described in claim 2, wherein the inputs define the plane through entry in defined order.

5. The method as described in claim 2, wherein the plane is determined based on a permutation of a plurality of possible permutations of the user inputs that introduces the least amount of error.

6. The method as described in claim 1, wherein the inputs are generated automatically and without user intervention.

7. The method as described in claim 6, wherein the inputs are generated automatically and without user intervention through edge or corner detection techniques involving at least one object in the two-dimensional digital image.

8. The method as described in claim 1, further comprising receiving, by the at least one computing device, an input to modify the visual guide via user interaction with the visual guide via the user interface and wherein the determining the orientation is based at least in part on the receiving of the input and wherein the input to modify is configured to resize, update, slide, or lift the visual guide with respect to the two-dimensional digital image.

9. The method as described in claim 1, further comprising generating, by the at least one computing device, the visual guide based on the inputs.

10. The method as described in claim 9, wherein the generating is based at least in part on a known camera projection model.

11. The method as described in claim 9, wherein the generating is based at least in part on a depth calculated using at least the inputs.

12. In a digital medium environment to perform composition of a three-dimensional (3D) object as part of a two-dimensional digital image, a system comprising:
   an orientation input module implemented at least partially in hardware of at least one computing device to:
      receive inputs in relation to the two-dimensional digital image;
      define rays corresponding to each respective input that radiate from an estimated camera position and pass through a point corresponding to the respective input; and
      determine a plane in relation to the inputs based on the rays and an orthogonality condition, the plane determined when an orthogonality error and a planarity error are below a threshold value;
   a visual guide generation module implemented at least partially in hardware of at least one computing device to generate and output a visual guide indicating the plane in conjunction with the two-dimensional digital image in a user interface; and
   a three-dimensional (3D) object placement module to orient the 3D object in the user interface as displayed in conjunction with the two-dimensional digital image based on 3D coordinates of the plane of the visual guide.

13. The system as described in claim 12, wherein the visual guide generation module further includes a visual guide modification module configured to modify the visual guide in response to an input received via the user interface.

14. The system as described in claim 13, wherein the visual guide generation module is configured to resize, update, slide, or lift the visual guide with respect to the two-dimensional digital image in the user interface.

15. The system as described in claim 12, wherein the visual guide generation module is configured to generate the visual guide based at least in part on a known camera projection model.

16. The system as described in claim 12, wherein the visual guide generation module is configured to generate the visual guide based at least in part on a depth calculated using at least one of the inputs defining the plane.

17. The system as described in claim 12, wherein the inputs specify four corners of the plane in relation to the two-dimensional digital image in the user interface through entry in a defined order.

18. The system as described in claim 12, wherein the plane is defined based on a permutation of a plurality of possible permutations of the user inputs that introduces a least amount of error.

19. In a digital medium environment to perform composition of a 3D object as part of a 2D digital image, a system comprising:
- means for receiving inputs in relation to the 2D digital image;
- means for defining rays corresponding to each respective input that radiate from an estimated camera position and pass through a point corresponding to the respective input;
- means for determining a plane in relation to the inputs based on the rays and an orthogonality condition, the plane determined when an orthogonality error and a planarity error are below a threshold value;
- means for outputting a visual guide in a user interface, the visual guide indicating the plane in conjunction with the 2D digital image;
- means for determining an orientation of the 3D object based on 3D coordinates of the plane of the visual guide; and
- means for displaying the 3D object at the orientation in conjunction with the 2D digital image in the user interface.

20. The system as described in claim 19, wherein the outputting means is configured to generate the visual guide based at least in part on a known camera projection mode or a known depth of at least one of the inputs defining the plane.

* * * * *